UNITED STATES PATENT OFFICE.

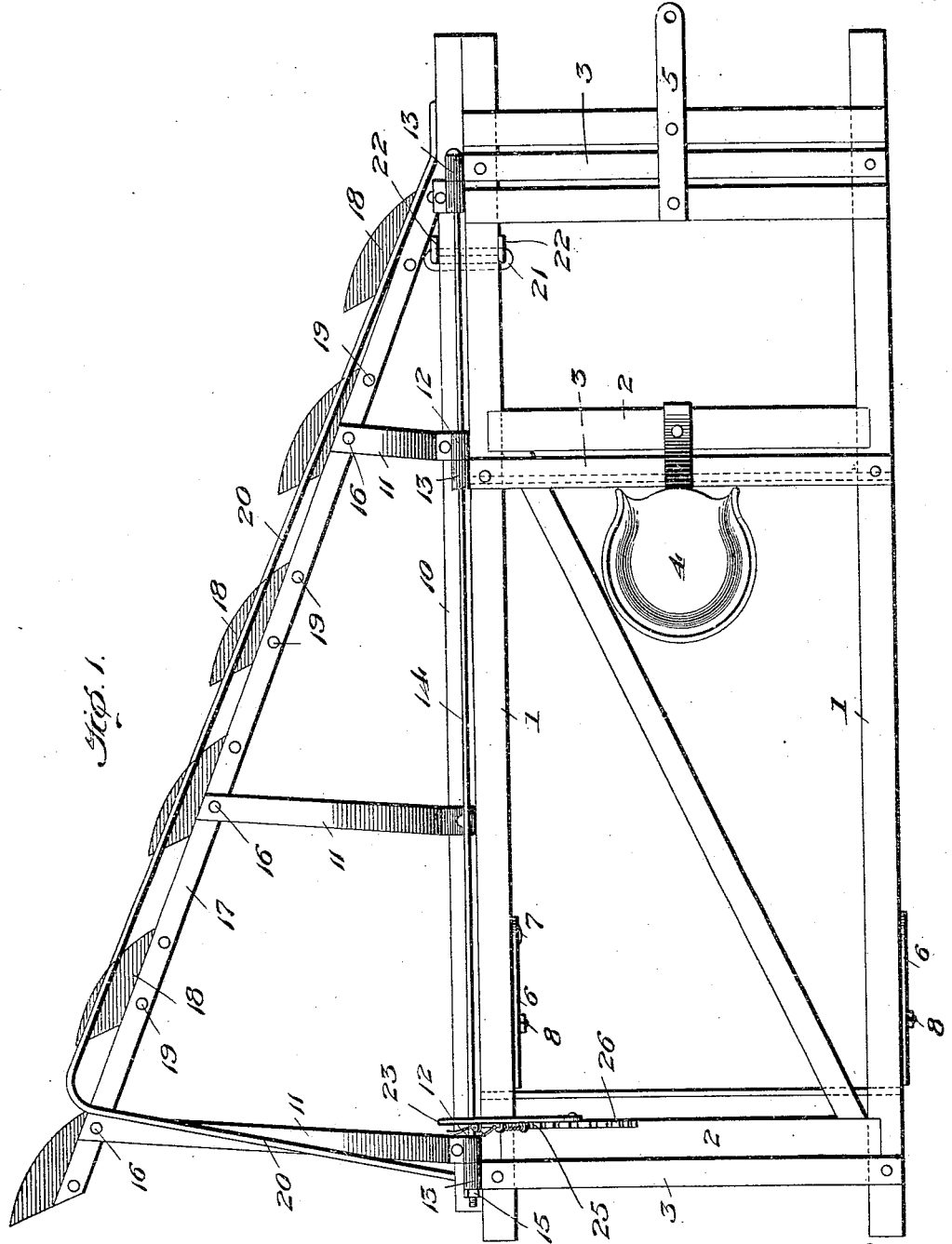

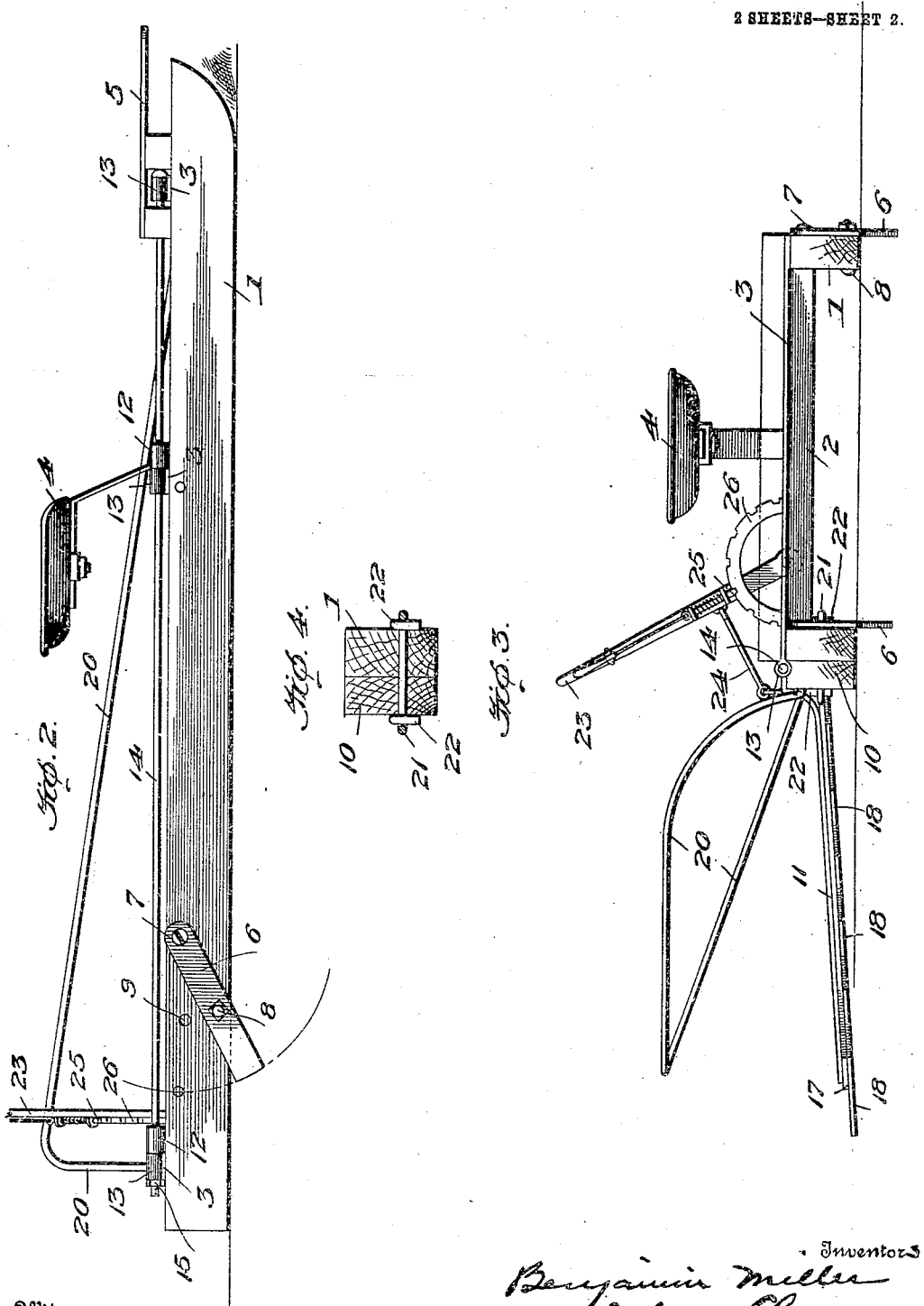

BENJAMIN MILLER AND JOHN CLEGG, OF WETASKIWIN, ALBERTA, CANADA.

BRUSH-CUTTING MACHINE.

958,417. Specification of Letters Patent. Patented May 17, 1910.

Application filed May 17, 1909. Serial No. 496,663.

*To all whom it may concern:*

Be it known that we, BENJAMIN MILLER and JOHN CLEGG, subjects of the King of Great Britain, residing at Wetaskiwin, Alberta, Canada, have invented certain new and useful Improvements in Brush-Cutting Machines, of which the following is a specification.

Our invention relates to brush cutting machines.

The object of the present invention is the provision of a machine for cutting brush and undergrowth which will be of strong, durable, simple, and inexpensive construction, sufficiently light and so constructed for the cutting operation that a team of horses may easily pull it when doing its heaviest work, which will be adapted to cut brush of from one-half inch up to five inches in diameter, more or less, wherein the knives will work close to, and if need be under, the surface of the ground.

Another object of the invention is the provision of a novel brush cutting machine having the knives carried by an improved form of adjustable frame whereby great strength and rigidity are obtained, wherein the knives are made interchangeable, and wherein a novel guard, carried by the knife frame in an improved manner, is employed to prevent the cut brush from falling upon the machine.

Another object of the invention is the provision of knives arranged on the frame in a novel manner whereby the machine is kept from slipping laterally when at work and which may be raised when the machine is moving from place to place.

Other objects of the invention will more fully appear hereinafter wherein is set forth a full disclosure of the invention, the novel features of which are recited in the appended claims.

In the accompanying drawings:—Figure 1 is a plan view of the invention; Fig. 2, a side elevation; Fig. 3, a rear end elevation; and Fig. 4, a detail cross-section showing the means for fastening the side runner to the main runner.

The machine has a main sled frame composed of main runners 1, cross braces 2, and cross brace irons 3. A suitable seat 4 is provided for the driver and the team is hitched to the attachment 5. To prevent side slipping of the machine, there are provided on the side runners 1, knives 6 which are pivoted at 7 and provided with securing bolts 8. Ordinarily the knives enter the earth a certain distance and hold the machine against side slipping but when the machine is being moved from place to place, the knives may be turned upwardly and the bolts 8 secured in the holes 9. By providing the knives 6, the frame may be made comparatively light and the use of weights to give tractive effect is obviated.

Disposed alongside of one of the main runners 1 is a side runner 10 which has brace irons 11 curved downwardly and extending laterally therefrom some of which are provided with hinge loops 12 through which and through hinge loops 13 on the brace bars 3 passes a hinge rod 14 having a nut 15 at one end whereby the rod may be readily removed so that the entire cutter frame can be readily detached when desired.

The brace irons 11 are secured at 16 to a knife bar 17 which is disposed obliquely in reference to the runners and carries any desired number of knives 18 which are detachably secured to the knife bar by detachable fastenings 19 and thus the knives are made interchangeable. Secured to the end parts of the side runner 10 is a guard 20, the outermost stretch of which lies substantially parallel to the knife bar 17 and a little beyond the same in a lateral direction, the rear part of this guard being much higher than the front part and thus inclined upwardly from the front to the rear part of the machine. This guard tends to work under and gradually elevate to vertical position any brush or growth which may be inclined and thus cause it to be presented in the most satisfactory manner to the action of the knives 18 besides preventing the cut brush from falling upon the machine or striking the driver.

In order that the side runner 10 may be securely fastened to the main runner 1 and made to abut said main runner throughout its length and thus more efficiently brace the frame carrying the cutting parts, a suitable fastening is employed. In the present instance this is shown as composed of a link 21 passing through corresponding apertures in the runners 1 and 10 and provided with removable cotters 22. Other fastenings could be employed. By the provision of the side runner 10 and its location flat against the runner 1, the entire machine is strengthened and flexing or bending of any of the parts is prevented, insuring greater steadiness when the machine is in operation and a better cutting effect.

When the machine is not in use or when being moved from place to place, it is desirable to elevate the cutting frame and guard and to this end there is provided a lever 23 pivoted to the rear cross brace 2, connected by a link 24 to the side runner 10, and provided with a latch 25 to lock the lever to a suitable comb 26 on the brace 2.

When the machine is to be used, the knives 6 are lowered to the positions shown in Figs. 2 and 3 and there secured. Continued penetration of these knives in the ground being traveled over, braces the machine and prevents it from being displaced laterally during the cutting operation, the runners traveling on the ground. The knives 18 cut the brush at, or even immediately under the surface of the ground and the guard directs the brush to the knives and also prevents it from falling upon the machine and the driver. In transporting the machine from place to place, the knives 6 are raised and secured, and the knives and their frame and the guard are also elevated.

Having thus described our invention, what we claim as new and desire to secure by Letters Patent, is:—

1. In a brush cutting machine, the combination with a main frame having a side piece extending longitudinally thereof, a movable cutter frame having a bar hinged to the bar of the main frame aforesaid and adapted to lie flat thereagainst in lengthwise disposition thereof, knives carried by the hinged cutter frame and movable therewith, and means for clamping the bars of the main and cutter frames together.

2. In a brush cutting machine, the combination with a sled frame having a runner extending longitudinally thereof, of a cutter frame having a side runner hinged to one of the runners of the sled frame and adapted to lie flat thereagainst throughout its length, knives carried by the cutter frame, and means for securing the side and sled frame runners together, side by side.

3. In a brush cutting machine, the combination with a main frame, and a cutter carried thereby, of a knife pivoted to the main frame and adapted to take into the ground, and means for securing said knife so that it may be engaged with the ground or held out of contact therewith, as when the machine is taken from one place to another.

4. In a brush cutting machine, the combination with a main frame, of a cutting frame, a cutter carried by the cutting frame, and a guard extending from a point near the ground at its forward end, rearwardly and upwardly for directing the brush to the cutter and for preventing the brush from falling on the main frame.

5. In a brush cutting machine, the combination with a frame, of a swinging cutter frame connected thereto, a cutter carried by the cutter frame, and a guard carried by the cutter frame which is adapted to direct the brush to the cutter and to prevent the brush from falling on the main frame.

6. In a brush cutting machine, the combination with the main frame, of a cutter frame composed of converging bars which are connected together, one of which extends lengthwise of the main frame, and a cutter carried by the other bar, and a guard carried by the cutter frame which has a part disposed above the cutter carrying bar of the cutter frame.

7. In a brush cutting machine, the combination with the main frame, of a cutter frame composed of converging bars which are connected together, one of which extends lengthwise of the main frame, and a cutter carried by the other bar, and a guard carried by the cutter frame which has a part disposed above the cutter carrying bar of the cutter frame and extending rearwardly and upwardly from the front of the machine in relation to the cutter bar.

In testimony whereof we hereunto affix our signatures in presence of two witnesses.

BENJAMIN MILLER.
JOHN CLEGG.

Witnesses:
D. R. AULTE,
A. BROCK.